United States Patent [19]

Walsh et al.

[11] Patent Number: 4,928,722

[45] Date of Patent: May 29, 1990

[54] PRESSURE RELIEF AFTER ELECTRIC SHUT-OFF OF PUMP

[75] Inventors: Warren J. Walsh, Waverly; Bruce Kallevig, Monticello, both of Minn.

[73] Assignee: Wagner Spray Tech Corporation, Minneapolis, Minn.

[21] Appl. No.: 318,971

[22] Filed: Mar. 6, 1989

Related U.S. Application Data

[62] Division of Ser. No. 899,316, Aug. 22, 1986, Pat. No. 4,834,287.

[51] Int. Cl.[5] .......... F16K 11/00

[52] U.S. Cl. .......... 137/881; 251/263; 200/61.86

[58] Field of Search .......... 251/263; 200/61.86; 137/861, 881, 637.1

[56] References Cited

U.S. PATENT DOCUMENTS

| | | | |
|---|---|---|---|
| 3,249,123 | 5/1966 | Berg | 251/263 X |
| 3,409,044 | 11/1968 | Sobek et al. | 251/263 X |
| 3,603,347 | 9/1971 | Paolini | 251/263 X |
| 3,700,002 | 10/1972 | Christie | 200/61.86 X |

*Primary Examiner*—John C. Fox

*Attorney, Agent, or Firm*—Hill, Van Santen, Steadman & Simpson

[57] ABSTRACT

A valve control mechanism for a paint spraying system provides for pressure relief prior to turn-off of the compressor. A pair of interlocking knobs, a pressure control knob and an off-prime-spray knob, are mechanically interlocked so that the compressor can only be turned on and off in a low pressure condition. When spraying has been completed, it is necessary to first operate the off-prime-spray knob to the prime position at which a cam structure opens the off-prime-spray valve for an immediate pressure relief prior to turn off of the pump.

2 Claims, 2 Drawing Sheets

PRESSURE RELIEF AFTER ELECTRIC SHUT-OFF OF PUMP

This is a division of application Ser. No. 899,316, filed Aug. 22, 1986, now U.S. Pat. No. 4,834,287.

BACKGROUND OF THE INVENTION

1. Field of the Invention

The present invention relates to pressure relief upon electric shut-off of a pump, and is particularly concerned with pressure relief within a predetermined time interval, for example within five second, upon shut-off of a spray gun.

2. Description of the Prior Art

Currently, particularly with respect to spray guns, manual pressure relief is required, as is warning of the danger of accidental injection of paint into the human body. Such warnings are contained in the owner's manuals for paint spray gunds and current spray systems require the operator to follow specific instructions to avoid accidental injection. Prior designs for automatic pressure relief valves create additional problems and require additional cleaning and maintenance. Such valves are more prone to malfunction than a manual valve. A poorly-maintained automatic relief valve may become clogged and place the operator in jeopardy of injection because failure of a relief valve requires the user to clean the sprayer and spray tip with high pressure in the hose, pump unit and valve body. Automatic pressure relief systems have centered about the utilization of systems which require moving a piston or valve which comes in contact with the material being sprayed. The movement of the pressure relief mechanism is triggered by pressure sensing on the discharge side of the pump, electrical solenoid and time delay devices with pistons, valves or actuators that come into contact with the material being sprayed.

SUMMARY OF THE INVENTION

The primary object of the invention is to provide automatic pressure relief upon shut-down of high pressure spraying in order to prevent accidental injection of the material being sprayed into the body of the operator. The pressure relief must be as inherently safe as in the manual method. The automatic feature must not give the operator a false sense of security and present a hazard by failure of the safety device.

Currently, the industry does not have a high pressure sprayer that has a pumping unit, a connecting hose, and a remote spray gun that are listed with Underwriters Laboratories (U.L.) in that U.L. has a requirement for an automatic pressure bleed-off valve which relieves the paint pressure within five seconds after the power has been turned off.

According to the present invention, a three position off-on knob is interlocked with a pressure control knob for controlling a high pressure spray and prime-dump valve for a spray gun.

When spraying has been completed, the interlocked knobs must be manipulated in a specific sequence before the pump can be turned off and it is during this sequence that the high pressure is relieved before the on-off knob can be placed in the off position.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
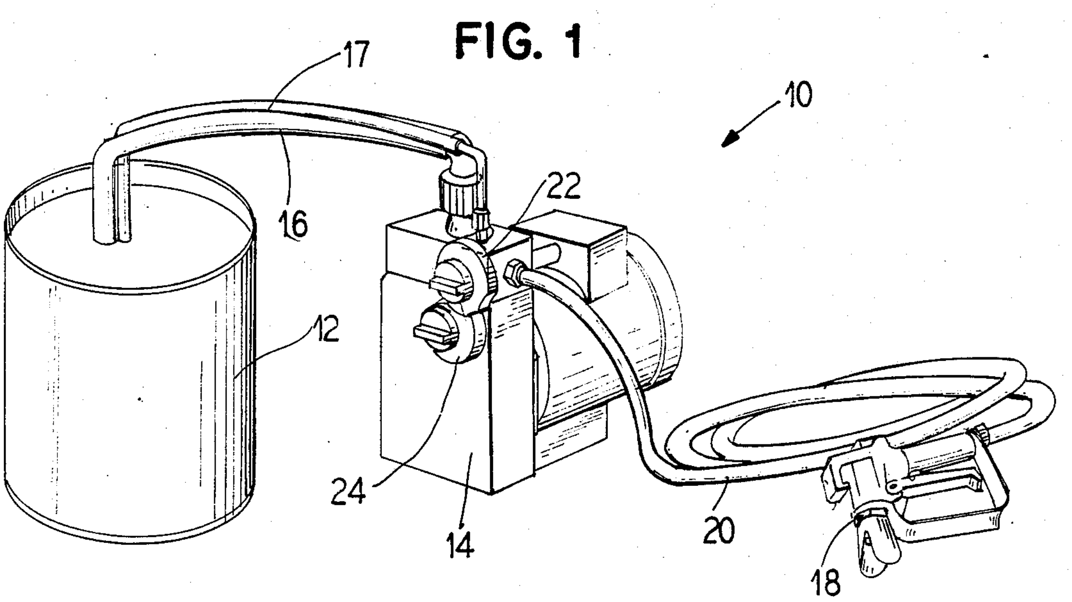
FIG. 1 is a pictorial representation of a paint spraying system showing the interlocking valve control knobs.

Referring to FIG. 1, a spray system is illustrated at 10 as comprising a reservoir 12 connected to a pump 14 by way of a delivery hose 16 and a prime-dump hose 17. A spray gun 18 is connected to the pump 14 by way of a hose 20. A pair of interlocking control knobs 22 and 24 are provided for controlling the mode of operation. The control knob 22 operates an off-prime-spray valve and the control knob 24 operates a pressure control valve. As will be evident from the discussion below, the knob 22 must be in the spray position before the pressure control can be turned up to a high pressure. Likewise, an operator cannot turn the unit off until the pressure control knob 24 has been placed in a low pressure position.

Figure 2:
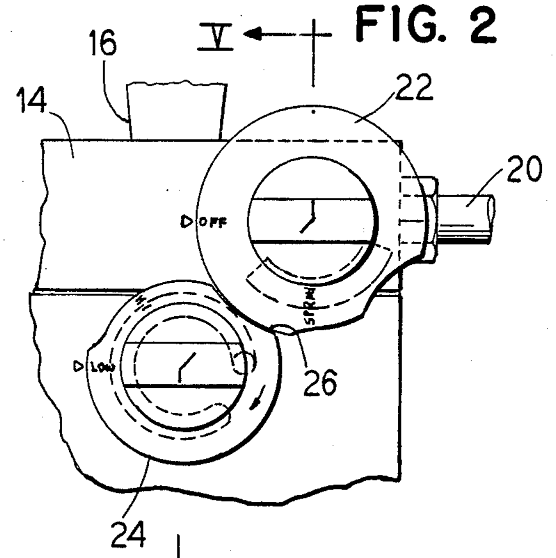
FIG. 2 is a partial elevation of the control knobs in the off and low pressure positions.

The basic mode of operation is as follows:

Referring to FIG. 2, the knob 22 is in the off position with the periphery thereof located in a detent 26 in the pressure control knob 24.

Figure 4:
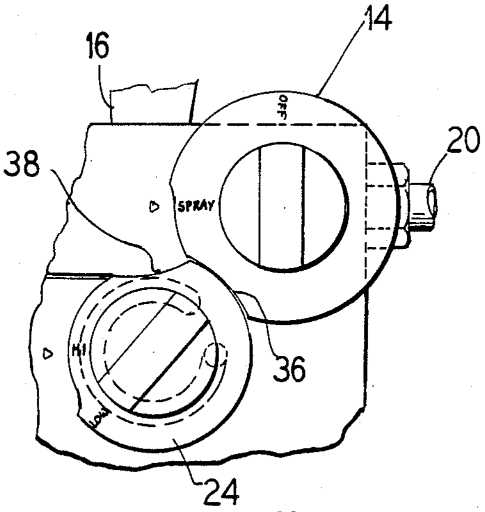
FIG. 4 is a partial elevation of the interlocking knobs in high pressure and spraying positions.
Figure 3:
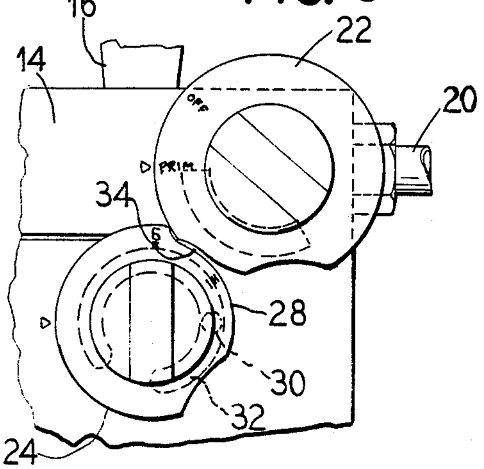
FIG. 3 is a partial elevation of the interlocking knobs in a medium pressure and priming position.

The unit is turned on, as shown in FIG. 3, by rotating the knob 22 to the prime position at which location a reduced diameter section 28 of the control knob 24 is located in a detent 34 of the knob 22. In this position, the unit becomes primed (paint circulates back to the tank 12) and the knob 24 may be adjusted counter-clockwise to increase the pressure. Referring to FIG. 4, after priming, the knob 22 may be rotated clockwise to the spray position. In this position, the periphery of the knob 24 is located in a detent 36 of the knob 22 and the spray pressure may be adjusted, as desired. In this position, however, it is abundantly clear that the knob 22 cannot be rotated counterclockwise to the off position until the knob 24 is rotated clockwise to the low pressure position at which time the outer periphery of the knob 22 is received in a detent 38 in the knob 24.

Figure 5:
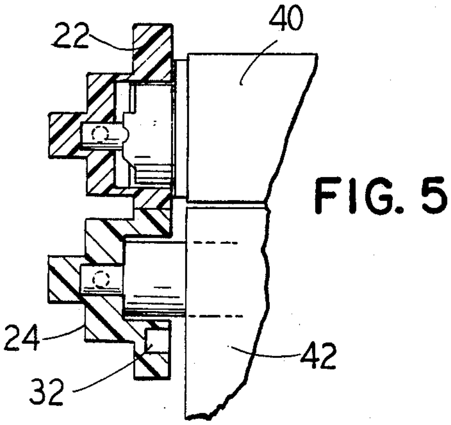
FIG. 5 is a sectional view taken substantially along the line V—V of FIG. 2.

As illustrated in FIG. 5, the knob 22 controls the off-prime-spray valve 40 while the knob 24 controls a pressure valve 42.

Referring to FIGS. 3 and 5, the knob 24 is illustrated as comprising a groove 32 which receives a pin 30. The ends of the groove 32 define stops for the pressure adjustment.

Figure 6:
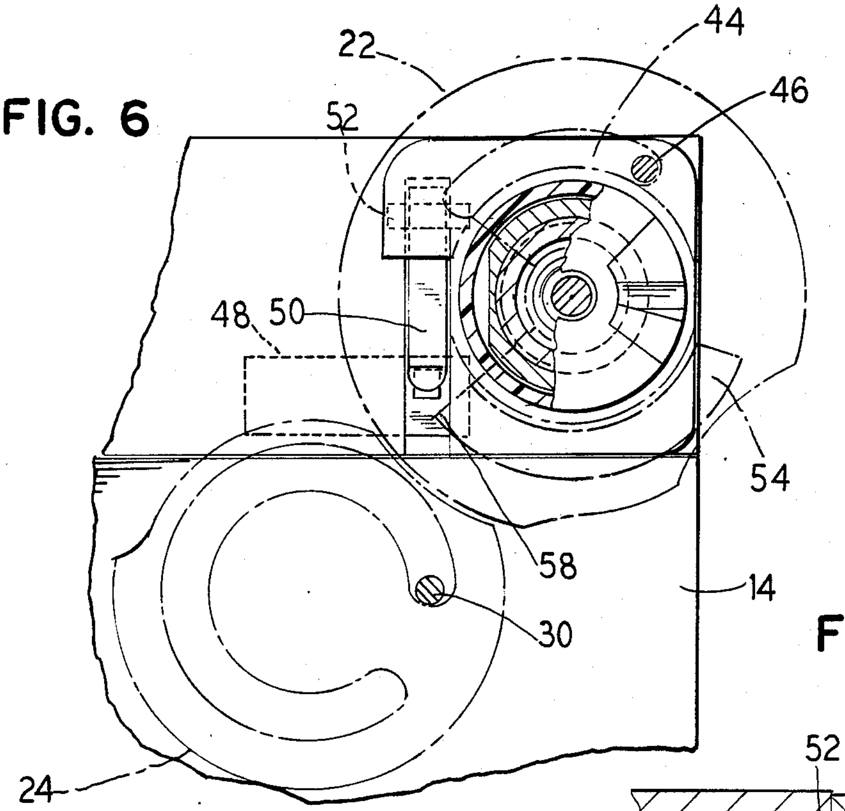
FIG. 6 is a view of the two knobs, shown partially in phantom, illustrating the limit and off-on switch camming structures.
Figure 7:
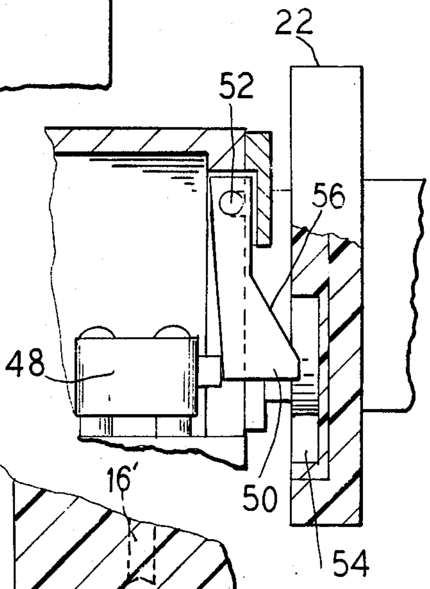
FIG. 7 is a sectional view showing the switch actuating mechanism.

Referring to FIGS. 6 and 7, the knobs 22 and 24 are illustrated as in FIG. 2, in the off position. In this condition, the knob 24 is in the low pressure position. In this configuration, the knob 22 may be rotated clockwise to the prime position. As the knob is rotated away from the off position, a switch actuator 50 is received in a groove 54 to close the switch 48 and energize the pump. As shown in FIG. 6, the actuator and the switch remain in the activated condition during rotation to and while the knob 22 is in the spray position. As the knob 22 is rotated in the counterclockwise direction, a cam follower ramp 56 (FIG. 7) engages the end 58 of the groove 54 (FIG. 6) to actuate the switch to the off condition.

Figure 8:
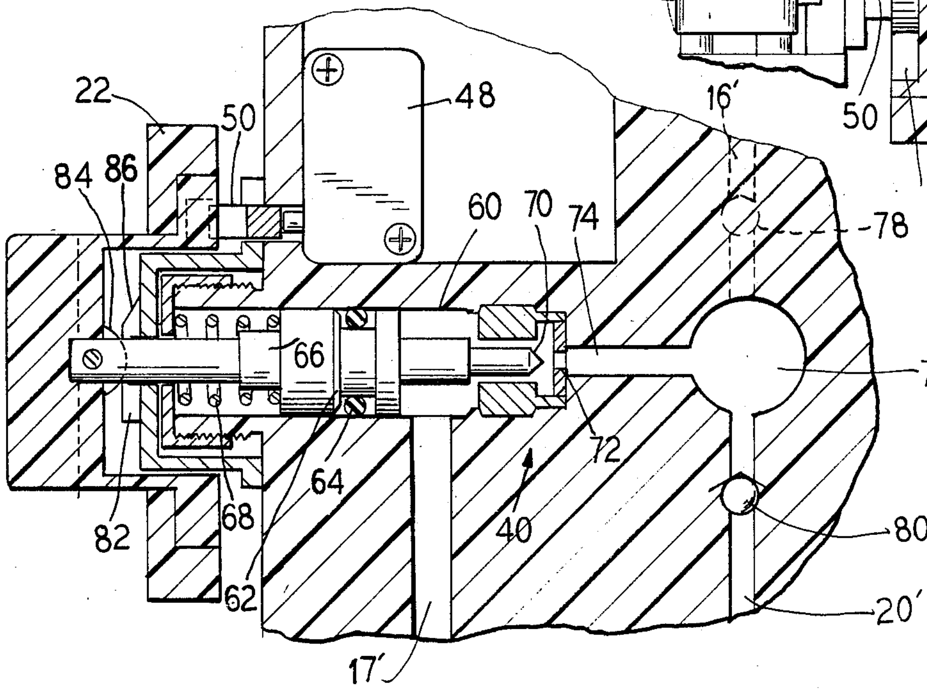
FIG. 8 is a longitudinal sectional view taken through the off-prime-spray valve.

Turning to FIG. 8, the off-prime-spray valve 40 is illustrated as comprising a bore 60 containing a piston 62 sealed thereto by way of an 0-ring 64. The piston 62 is mounted on a shaft 66 which is, in turn, connected to the off-prime-spray control knob 22. At the opposite end, the shaft 66 carries a valve 70 which mates with a valve seat 72. The bore 60 may communicate with a passageway 74 by way of the valve seat 72, the passageway 74 communicating with a chamber 76 which connects a paint input passageway 16' and a paint output passageway 20' by way of respective check valves 78, 80. The bore 60 also communicates with a prime-dump passageway 17'. Herein, the primes indicate the respective hoses in FIG. 1.

The valve 40 is illustrated in the prime condition. In this condition, the knobs are positioned as illustrated in FIG. 3. As seen at the left-hand side of FIG. 8, the pump carries at least one cam 82 and at least one cam follower 84 is mounted inside of the knob 22. The cam follower, upon rotation into the prime position, moves outwardly along the ramp 86 so that the inlet passageway 16' is placed in communication with the prime-dump passageway 17' by way of the valve 78, the chamber 76, the passageway 74, the valve seat 72 and the chamber 60. Therefore, paint circulates through the system. When the knob 22 is rotated to the spray position, as shown in FIG. 4, the cam follower no longer engages the cam 82 and the spring 86 urges the valve 70 into the valve seat 72. The paint now flows from the passageway 16' to the passageway 20' via the valve 78, the chamber 76 and the valve 80.

After completion of spraying and as set forth above, it is necessary to place the knob 24 at a low pressure setting and place the knob 22 in the prime position before the knob 22 can be rotated to the off position. As the knob 22 is placed in the prime position, the action of the cam 82 is placed is the prime position and the cam follower 84 causes the valve to open and an immediate dump occurs to the reservoir 12. Therefore, the requirement for a relief within five seconds of shut-off has not only been achieved, but has been provided prior to electrical de-energization of the pump.

Although we have described our invention by reference to a particular illustrative embodiment thereof, many changes and modifications of the invention may become apparent to those skilled in the art without departing from the spirit and scope of the invention. We therefore intend to include within the patent warranted hereon all such changes and modifications as may reasonably and preferably be included within the scope of our current addition to the art.

We claim as our invention:

1. A valve system comprising:

a valve body, including a fluid inlet, for receiving fluid under pressure, a first fluid outlet connected in communication with said fluid inlet and adapted to be opened and closed, a second fluid outlet, an opening defining a valve seat between said fluid inlet and said second fluid outlet, a (board) communicating with said valve seat and said second fluid outlet, a piston slidably mounted in said board, a valve carried by said piston for receiving said valve seat, spring means moving in said board and urging said piston to mate said valve with said valve seat;

a switch mounted on said valve body;

a shaft connected to said piston and extending out of said valve body;

a rotatable knob connected to said shaft;

a switch actuator mounted on said valve body and bearing against said knob;

cooperable cam means on said knob and on said valve body operable to move said shaft axially upon rotation of said knob to a predetermined position and unset said valve from said valve seat; and a groove in said knob for receiving said switch actuator and causing actuation of said switch when said knob is rotated to said predetermined position.

2. A valve system comprising:

a valve body, including a fluid inlet receiving fluid under pressure, a first fluid outlet connected in continuous communication with said fluid inlet and adapted to be opened and closed, a second fluid outlet, an opening defining a valve seat between said first fluid inlet and said second fluid outlet, a bore communicating with said valve seat and said second fluid outlet, a piston slidably mounted in said bore, a valve carried by said piston for receiving said valve seat, spring means moving in said bore and urging said piston to mate said valve with said valve seat;

a shaft connected to said piston and extending out of said valve body;

a first rotatable knob connected to said shaft;

cooperable cam means on said first rotatable knob and on said valve body operable to move said shaft axially upon rotation of said first rotatable knob to a predetermined position and unseat said valve from said valve seat to place said fluid inlet and said second fluid outlet in communication and to bypass and remove pressure from said first fluid outlet; and a second rotatable knob operatively interconnected with said first rotatable knob to prevent rotation of said first rotatable knob until said second rotatable knob is rotated to a selected position.

* * * * *